United States Patent [19]
Kranawetter et al.

[11] Patent Number: 5,309,234
[45] Date of Patent: May 3, 1994

[54] ADAPTIVE LETTERBOX DETECTOR

[75] Inventors: Greg A. Kranawetter, Carmel; Timothy W. Saeger; Donald H. Willis, both of Indianapolis, all of Ind.

[73] Assignee: Thomson Consumer Electronics, Indianapolis, Ind.

[21] Appl. No.: 7,390

[22] Filed: Jan. 21, 1993

Related U.S. Application Data

[63] Continuation of Ser. No. 817,237, Jan. 6, 1992, abandoned, continuation-in-part 3,739 May 29, 1991, abandoned.

[51] Int. Cl.$^5$ .................. H04N 7/01; H04N 5/45; H04N 5/44
[52] U.S. Cl. .................. 348/473; 348/704; 348/469; 348/739; 348/913
[58] Field of Search ............ 358/141, 142, 242, 180, 358/140, 11, 12, 188, 230, 231; H04N 5/46, 5/445, 5/45, 5/44, 7/01, 7/00, 5/66

[56] References Cited

U.S. PATENT DOCUMENTS

| | | | |
|---|---|---|---|
| 4,670,784 | 6/1987 | Goldberg | 358/141 |
| 4,679,091 | 7/1987 | Kikuchi et al. | 358/242 |
| 4,760,455 | 7/1988 | Nagashima | 358/242 |
| 4,761,587 | 8/1988 | Wharton | 315/408 |
| 4,766,355 | 8/1988 | Kadlec et al. | 315/399 |
| 4,769,705 | 9/1988 | Lendaro | 358/158 |
| 5,032,907 | 7/1991 | Isnardi | 358/141 |
| 5,068,728 | 11/1991 | Macovski | 358/141 |
| 5,084,765 | 1/1992 | Morila et al. | 358/141 |
| 5,097,332 | 3/1992 | Faroudja | 358/141 |
| 5,136,380 | 8/1992 | Cho | 358/141 |
| 5,136,398 | 8/1992 | Rodriquez-Cavazos et al. | 358/141 |
| 5,146,335 | 9/1992 | Kim et al. | 358/183 |
| 5,159,438 | 10/1992 | Rabii | 358/12 |
| 5,249,049 | 9/1993 | Kranawetter et al. | 358/141 |

FOREIGN PATENT DOCUMENTS

| | | |
|---|---|---|
| 60-165883 | 8/1985 | Japan. |
| 63-185173 | 7/1988 | Japan. |
| 63-193779 | 8/1988 | Japan. |
| WO91/19390 | 12/1991 | PCT Int'l Appl. . |
| 2251755 | 7/1992 | United Kingdom. |

Primary Examiner—James J. Groody
Assistant Examiner—Safet Metjahic
Attorney, Agent, or Firm—Joseph S. Tripoli; Joseph J. Laks; Harvey D. Fried

[57] ABSTRACT

A video display control system automatically controls a video display responsive to detection of letterbox format input video signals having varying format display ratios. A detection circuit continuously detects the first and last lines of active video in a video signal. A memory stores scan line numbers corresponding to the first and last lines of active video. The height of the picture is determined from the scan line numbers of the first and last lines of active video. The picture height is indicative of the format display ratio of the letterbox input. A comparator circuit compares the picture height to a threshold corresponding to the widest expected format display ratio of a letterbox input signal. A control circuit, for example a microprocessor, is operable in a first mode of operation for enabling the memory to continuously update the stored scan line numbers unless the picture height exceeds the threshold, and operable in a second mode of operation for enabling the memory to update the stored scan line numbers when active video is detected in a video line corresponding to a scan line number less than the stored first line or greater than the stored last line. At least one of picture size and picture cropping on the display means is controlled responsive to the picture height. A circuit for initiating the first mode of operation after the second mode of operation can operate automatically or manually.

24 Claims, 10 Drawing Sheets

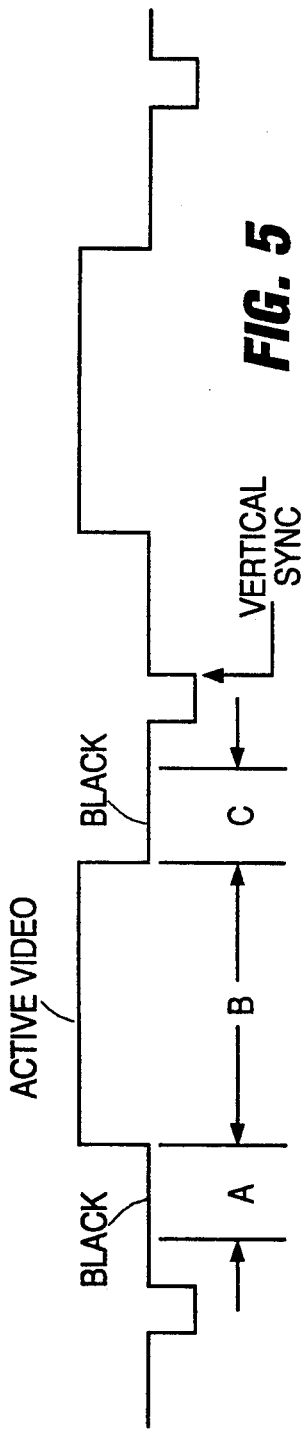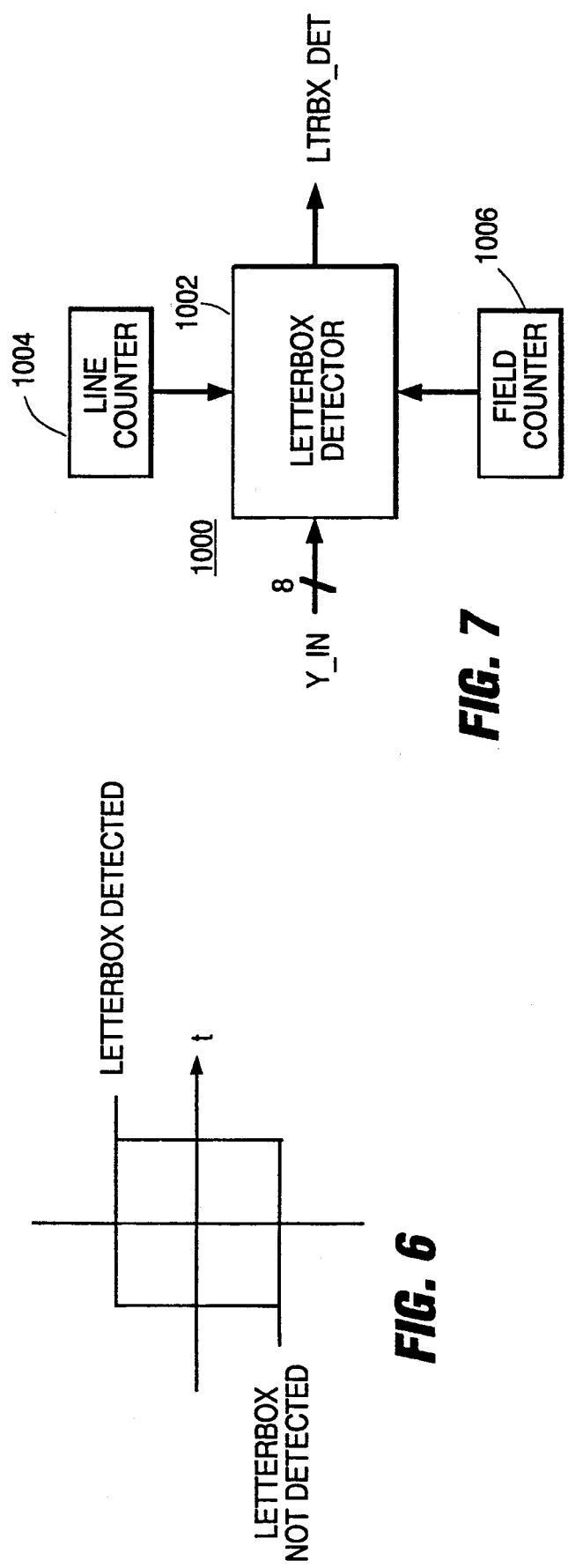

ADAPTIVE LETTERBOX DETECTOR

This application is a continuation of copending U.S. application Ser. No. 817,237 filed Jan. 6, 1992, and now abandoned. U.S. application Ser. No. 817,237 is a continuation-in-part of copending international application no. PCT/US91/03739, filed May 29, 1991, and designating the United States.

The invention relates to television receivers having a viewing area with a particular display format ratio or aspect ratio, including a controller for determining the active video portion of a signal and adaptively displaying the active video portion so as to make full use of the vertical viewing area. The picture can be zoomed vertically and horizontally. However, insofar as the zoom is such that the horizontal dimension does not correspond to the horizontal screen dimension, the picture will be horizontally cropped or displayed with vertical sidebars. The invention responds adaptively to changes in the format ratio of the active video to selectively adjust the proportion of compression or expansion (zoom) and pan, to fill the entire viewing area, or to vertically fill the viewing area, with the active video portion of the received signal. The selection can depend upon viewer preference or be programmed in advance. In one alternative, the viewer watches a picture which fills the screen, at the cost of partially cropped information content. In the other alternative, the viewer watches a picture which has complete information content, at the cost of watching a smaller picture which does not utilize the entire screen.

The display area of a television receiver typically has either a format display ratio of 4 units of width to 3 units of height (referred to as "4×3" or "4:3"), or a format ratio of 16×9 (16:9), which is conventionally considered a "wide screen" or movie format ratio. These ratios are relatively standard, although other ratios are known as well. Receivers having a particular format display ratio are limited in the ways that signals provided at a different format ratio can be presented. Similarly, where multiple video signals are to be displayed, the format ratio available for a given one of the signals may present constraints.

Commercial broadcasts are most often in a 4×3 format display ratio (relatively taller and/or narrower), such that the full display area of a conventional 4×3 receiver is occupied by the full picture. Whereas most video products on the market have this 4×3 ratio, wide screen displays are also known, intended for example for viewing wide screen movies. Movie productions are available in widely varying aspect ratios, and the 16×9 ratio (relatively shorter and/or wider) is more or less standard for a wide screen format for television.

Many viewers find the 4×3 display format less pleasing than the wider format display ratio associated with movies. Regardless of where the receiver may be, the wider format is perceived to give the impression of a movie theater while the narrower format has a look associated by viewers with home television viewing. A wide format display uses its full area to display the full movie ratio signal, without the need to crop or distort the original movie picture, e.g., via a telecine device, processors in the television receiver, or the like.

To show a 4×3 signal on a 16×9 display unit, or to show a 16×9 signal on a 4×3 display unit, either less than all of the display unit area is used, or the video information is altered. The received picture can be zoomed to fill the screen in one dimension, with portions in the other dimension removed from the signal. For example, top and bottom portions of a 4×3 signal can be cropped, with the remainder filling a 16×9 format area, or side portions of a 16×9 signal can be cropped, with the remainder filling a 4×3 area. It is the ratio of width to height which is of concern rather than any need to enlarge or contract the signal in general.

Instead of simply cropping the signal, it is known to pan up and down or from side to side, either automatically or under control of a telecine operator or the like, to avoid loss of important information in the scene. It is also known to distort the signal to be displayed, for example compressing a 16×9 signal horizontally for display on a 4×3 display unit, as is often seen when screen credits from a Cinemascope (16×9) movie are displayed in a commercial (4×3) broadcast. Cropping, panning and distortion all omit or adversely affect the quality and/or content of the picture.

When displaying one format ratio active video signal without cropping or distortion on a different format ration display unit, the displayed signal occupies less than all the available area of the screen. The unused area of the display unit is blanked or caused to display a background color matte. However, this border area can be used, e.g., to display another picture simultaneously with the main picture, or to display text information.

In so-called "letterbox" format, a wide format ratio image is displayed across the full width of a narrower format ratio display unit, and the top and/or bottom areas are used if at all to display text such as storm warnings, news alerts, etc. This function can be made selectable at the viewer's option. Movies in a wide format to be broadcast commercially without distortion or cropping are converted by the broadcaster to letterbox format, to enable display on a conventional 4×3 receiver screen. The broadcaster effectively adds blank or matte top and bottom borders, and broadcasts the combined picture and borders in a 4×3 composite image signal. Assuming standard 16×9 and 4×3 ratios, only 181 horizontal lines in each field are devoted to the main video, the remaining lines being the matte, gray or black borders. The borders are akin to a picture from a second video source, simultaneously displayed with the main picture.

It can be a complex problem to adjust format ratios, particularly if multiple active video sources are to be displayed at once. It may be necessary, for example, to develop consistent timing signals from asynchronous simultaneously-displayed sources, to switch between multiple sources during scanning to generate multiple picture displays, and/or to provide lower resolution compressed displays from higher resolution picture data signals.

It is an aspect of the invention automatically to adjust a means for displaying a video source signal so as to adaptively accommodate any format display ratio within a predetermined range, the active portion of the video source signal being expanded vertically and centered so as to fill the display screen.

It is another aspect of the invention to detect a first and last line of active video in the video source signal repetitively and to calculate a zoom level and a pan position at which the current active video will fill the display area, for adaptively responding to changes in aspect ratio.

It is also an aspect of the invention to accomplish adjustment of the video signal in a manner which is insensitive to spurious line readings and blank or otherwise invalid screens.

According to an inventive arrangement, an incoming signal is converted continuously and adaptively from whatever active video display format ratio, into a display format that uses all the available vertical screen area, subject to user selection or programming. Even if the display format ratio changes during viewing, for example where border lettering appears or thereafter disappears in a letterbox format signal, or where the incoming signal changes from letterbox to conventional or back, the receiver according to the invention recalculates the timing and display parameters to adjust over successive fields, making optimal use of the available display area. The invention provides high resolution, single and multiple picture displays from single or multiple asynchronous sources having similar or different format ratios, and with selectable display format ratios, all on a continuous and adaptively ongoing basis.

A wide screen television, as described herein can have a format display ratio, for example, of 16×9. The invention provides an opportunity to display signals which are received in the letterbox format with greater flexibility. Signals that were originally produced in the 16×9 aspect ratio but have been converted to letterbox images (e.g., a 4×3 image with blanked top and bottom borders around the active video) may be zoomed or expanded to fill the screen with the active video while maintaining the original aspect ratio thereof.

Sources in which the active video has an aspect ratio greater than the display screen ratio (e.g., a 20:9 source vs. 16:9 screen) fill the screen vertically and are horizontally cropped. Sources having an aspect ratio less than that of the screen fill the screen horizontally and are vertically cropped. Those portions of the a 4×3 broadcast signal devoted to the matte borders are automatically cropped. The correction is made adaptively, recalculating the extent of the zoom and pan as the situation changes.

A video display control system according to an inventive arrangement automatically controls a video display responsive to detection of letterbox format input video signals having varying format display ratios. A detection circuit continuously detects the first and last lines of active video in a video signal. A memory stores scan line numbers corresponding to the first and last lines of active video. The height of the picture is determined from the scan line numbers of the first and last lines of active video. The picture height is indicative of the format display ratio of the letterbox input. A comparator circuit compares the picture height to a threshold corresponding to the widest expected format display ratio of a letterbox input signal. A control circuit, for example a microprocessor, is operable in a first mode of operation for enabling the memory to continuously update the stored scan line numbers unless the picture height exceeds the threshold, and operable in a second mode of operation for enabling the memory to update the stored scan line numbers when active video is detected in a video line corresponding to a scan line number less than the stored first line or greater than the stored last line. At least one of picture size and picture cropping on the display means is controlled responsive to the picture height. A circuit for initiating the first mode of operation after the second mode of operation can operate automatically or manually. The system can adaptively display the input video signal in the maximum available display area, or with maximum vertical height, regardless of the specific aspect ratio used for the letterbox, and regardless of the extent to which the borders are occupied by text or the like.

A video display control system according to another inventive arrangement comprises a video display having a first format display ratio. A picture height circuit determines an active video picture height from an input video signal having a second format display ratio. A detector circuit identifies letterbox formats responsive to the active video picture height in the video signal and determines a format display ratio of the letterbox picture. A zoom control circuit is operable in a first mode of operation for enlarging the picture in size to fill the display substantially entirely, notwithstanding consequent cropping of the picture, and operable in a second mode of operation for enlarging the picture in size to substantially fill the display vertically, notwithstanding consequent unused portions of the display. A vertical pan control circuit automatically centers the picture in both modes of operation. The detector can identify the format display ratio of the letterbox format picture. A circuit responsive to the identified format display ratio controls image aspect ratio distortion of the enlarged picture. A deflection system is controllable in vertical size by a variable vertical scan rate, in horizontal size by variable horizontal video expansion and compression, and in pan position by varying the vertical reset in phase.

The letterbox video signal can be considered to have three regions (assuming the active video is disposed vertically in the middle, instead of at the extreme top or bottom). These regions, denoted A, B and C, are such that regions A and C have no active video, or matte color video luma levels which are less than a predetermined threshold of luma or luma variability. These borders correspond to relatively dark or featureless bars. Region B has active video, or at least video luma levels which are more than the predetermined luma threshold and typically are highly variable, corresponding to the picture between the dark bars. The respective time intervals of regions A, B and C are a function of the specific letterbox format used, which can range for example from 5×3 to 24×9, a popular ratio of 16×9 falling within the range.

The horizontal line time duration of regions A and C is approximately 20 lines each for 16×9 letterbox format. The letterbox detector counts horizontal lines while examining the luma levels for regions A and/or C. If active video, or at least a minimum video luma level, is found in regions A and/or C, the letterbox detector provides an output signal which stores the present horizontal scanning line count, for recalculating the conversion ratio that will place the initial and final lines of active video at predetermined points on the display screen, normally either at the extreme top and bottom, or at the respective heights which will result in the full horizontal width of the screen being occupied. The user preferably can choose options which the apparatus will effect in the display, for example permitting the user to select presentation of blank borders if desired, or cropping, compression, expansion or combinations of these.

Operation of the detector is improved by responding proportionately to a change in the aspect ratio of the received signal. Once a particular aspect ratio signal is established for display of the signal, and thereafter active video is detected outside of the display area (e.g., text for display in the letterbox borders of the incoming signal), the display is changed to the new ratio over a number of successive frames. Preferably, the change is accomplished by responding incrementally or proportionally to changes in ratio such that the picture expands or contracts as appropriate over a number of successive frames. The amount of incremental change can be related to the extent of correction required to reach the new aspect ratio. For reduction of noticeable jitter or the like, a minimum line count threshold can be established before a correction is undertaken.

The uppermost and lowermost active video areas preferably are detected by calculating two gradients for each line in the video field. Four values are required to calculate the two gradients: maximum and minimum values of the current line, and maximum and minimum values of the previous line. The first gradient, designated the positive gradient, is formed by subtracting the minimum value of the previous line from the maximum value of the current line. The second gradient, designated the negative gradient, is formed by subtracting the minimum value of the current line from the maximum value of the previous line. Either of the gradients may have positive or negative values depending on scene content, but the negative values of both gradients may be ignored. This is because only one gradient may be negative at a time, and the magnitude of the gradient with the positive value will always be greater than or equal to the magnitude of the gradient with the negative value. This simplifies the circuitry by eliminating the need to calculate an absolute value of the gradients. If either gradient has a positive value which exceeds a programmable threshold, video is considered to be present on either the current line or on the previous line. These values can be used by a microprocessor to make a determination of whether or not the video source is in the letterbox format and to determine the respective line numbers. The calculation can be performed only for the top (or the bottom) of the image, provided means are provided for centering the image vertically. Whereas the detection of active video is a function of gradient rather than luma absolute value, the device therefore detects inactive borders of a predetermined matte color, even if the borders have a substantial (but unchanging) luma level.

Similarly, the horizontally outermost active area of the image can be determined by calculating gradients for successive pixels or groups of pixels at the beginning or end of successive horizontal lines. Again, this need only be done on one side if the picture is centered.

FIGS. 1(a)-1(f) illustrate different display formats of a wide screen television, with FIG. 1(d) illustrating certain terms used herein.

FIGS. 5 and 6 are diagrams useful for explaining operation of an automatic letterbox detector.

FIG. 7 is a block diagram of an automatic letterbox detector as explained in connection with FIGS. 5 and 6.

The four parts of FIG. 1 illustrate a subset of picture display formats which can be implemented according to different inventive arrangements. The 16×9 and 4×3 basic formats are shown superimposed on one another as one example of superimposing formats having different aspect ratios. According to the invention the formats superimposed on one another need not be limited to any specific sizes because the apparatus according to the invention automatically senses the active video aspect ratio and optimizes the presentation to the size of the display.

Figure 1A:
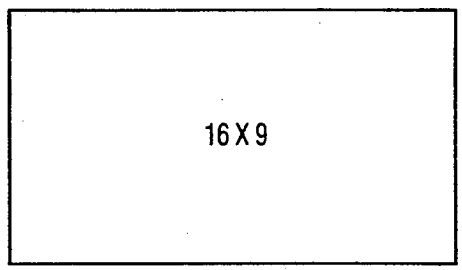
Figure 1B:
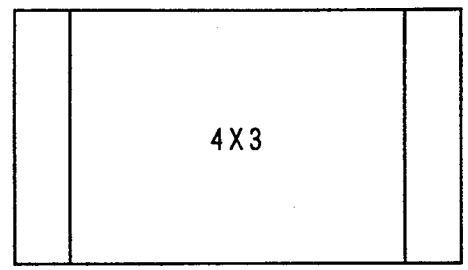
Figure 1C:
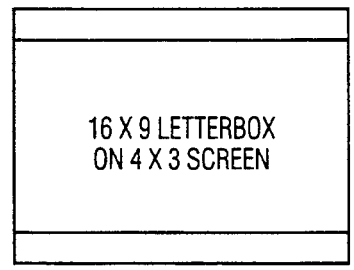

FIG. 1(a) illustrates a television, for example direct view or projection, having a relatively wide (e.g., 16×9) format display ratio on which a picture can be displayed. When a 4×3 picture is transmitted and displayed, as in FIG. 1(b), inactive video areas displayed as vertical black, gray or matte bars appear at the lateral sides. Similarly, when a 16×9 picture is displayed on a 4×3 format display as in FIG. 1(c), the inactive video areas occur as horizontal bars on the top and bottom. The arrangement shown in FIG. 1(c) can be encoded in a video signal from a source, whereupon the signal is commonly referred to as being in letterbox format. In this instance, the viewed picture is vertically smaller than the available display area, as necessary to display the full horizontal line information without cropping or compressing the video information. Assuming that a 16×9 format display ratio source is converted prior to transmission, so that it will fill the vertical extent of a viewing surface of 4×3 format display, it is clear from FIG. 1(b) that either information will be cropped from the left and/or right sides, or optionally compressed, whereby the resulting picture will evidence distortion by relative vertical elongation (equivalent to relative horizontal compression). It is also possible to pan the displayed signal, which is a further alternative. Whereas all of these alternatives either omit or change the nature of the signal, none is particularly appealing.

The automatic letterbox detection system of the invention automatically vertically expands and centers letterbox sources with variable aspect ratios to fill a television screen vertically while maintaining the original aspect ratio. Sources with aspect ratios greater than 16:9 are horizontally cropped while those with aspect ratios less than 16:9 are displayed with sidebars visible. The vertical zoom is controlled by varying the vertical scan rate; the horizontal zoom is controlled by varying the horizontal expansion/compression; and, the vertical pan is adjusted by varying the phase of the vertical reset pulse. After the initial zoom in, the system calculates these parameters and updates them if active video is detected in regions of the picture not displayed. The line numbers from the detection circuit are filtered to eliminate spurious readings, and blank or invalid screens are ignored.

Figure 1D:
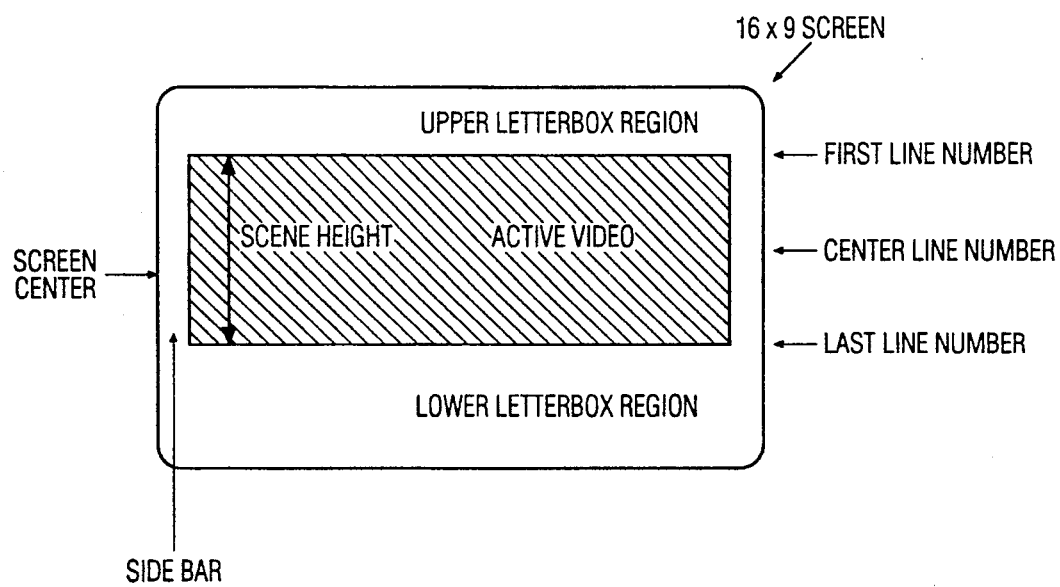

Referring to FIG. 1(d), the first line number (the first line of active video detected in the current field) is obtained from a register in the letterbox detection circuit, as is the last line number. Similarly the video begin line (the line number between the upper letterbox region and the active video region) and the video end line (bordering the lower letterbox region) are obtained. The scene height can then be calculated as the difference between the end line number and the begin line number, and the center line number calculated as the average of the two. The screen center is the line number at the center of the screen, and is preferably the spot at which the center line number will be displayed.

For eliminating errors, the height of the scene is compared to a minimum height threshold corresponding to the greatest aspect ratio that is expected to be encountered (typically 24:9). When this threshold is exceeded, it is assumed that the current scene is blank or the current line numbers are invalid, and no adjustments are made based on the values.

For eliminating jitter, the difference between the current and previous values of the screen parameters are compared to a change threshold. When the difference is less than the threshold, the resulting change does not warrant updating the parameters. When updated values for the first and last line number of active video are requested, the letterbox detector registers are sampled. This occurs no more than once per frame for multiple frames. The results are filtered, e.g., via a two stage median filter, and used to determine the borders between the active video and letterbox regions.

The system is activated by the user when a letterbox video source is present and it is desired to fill the screen vertically with active video. Once activated, scene height and center of scene are calculated from the first and last line numbers of the current scene. If the scene height is less than the minimum height threshold, the system continues to update scene height until the threshold is exceeded. This causes the system to ignore blank scenes and erroneous first and last line numbers.

Figure 1E:
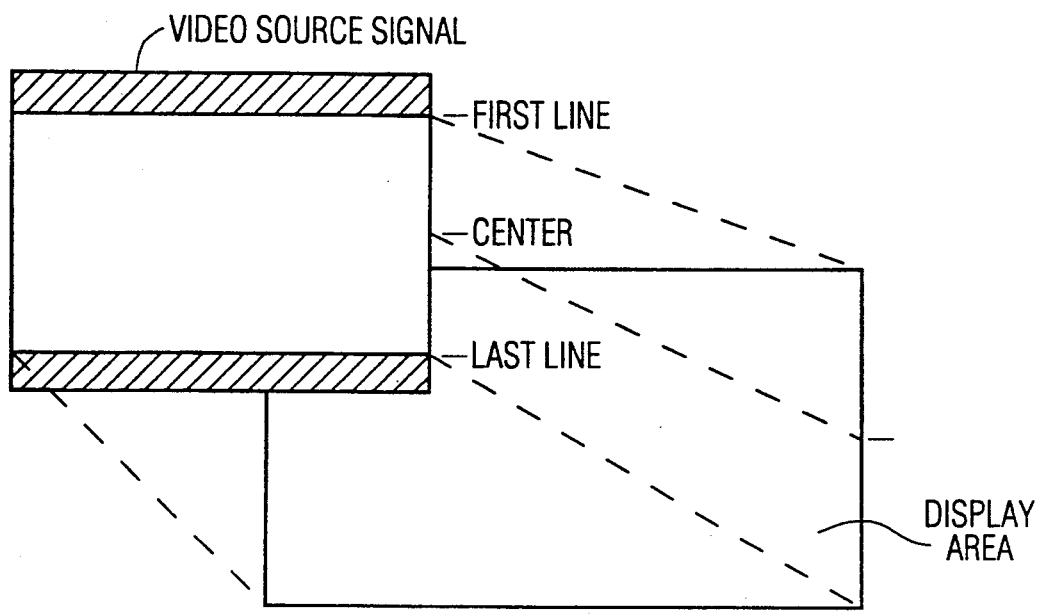
Figure 1F:
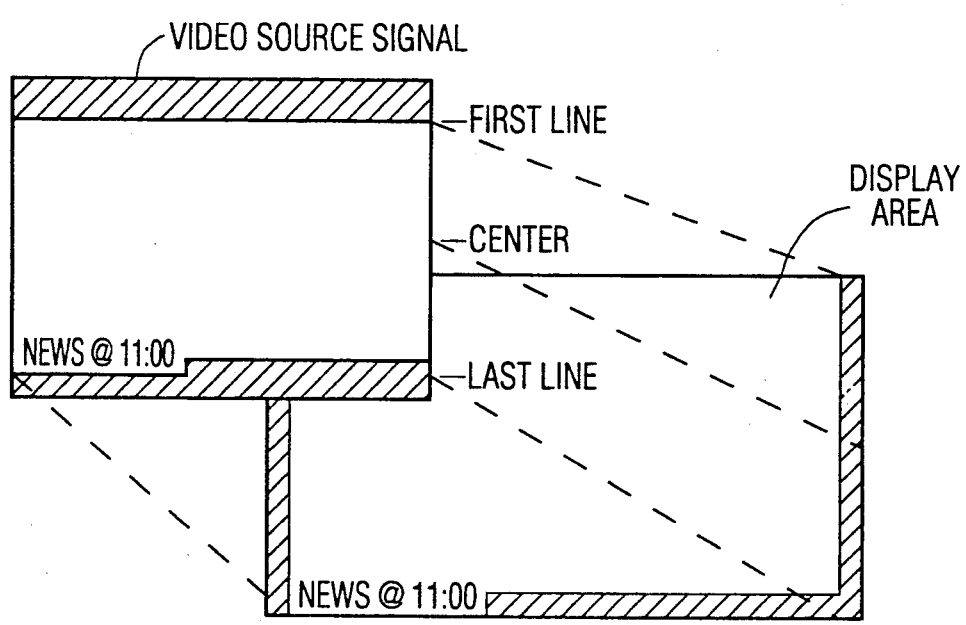

A comparison of FIGS. 1(e) and 1(f) shows the practical effect of the invention. In FIG. 1(e), active the letterbox source signal has been zoomed by the required amount to fill the screen of a wide format display. In the embodiment shown the zoom in both the horizontal and the vertical dimensions (which are proportionately equal so as to maintain the aspect ratio of the active video signal) is such as to exactly match the dimensions of the wide screen display area. It is also possible that an active video signal having an aspect ratio greater than that of the display area could be received, in which event filling the vertical area would cause the edges of the horizontal picture to be cropped.

Should active video appear in the letterbox region, such as the storm warning shown in FIG. 1(f), the last line number of active video changes. As a result, the system updates the center line number and the extent of zoom such that the new last video line appears at the bottom of the display area. This operation is distinct from simply switching from one format ratio to another because, as shown in FIG. 1(f), the zoom and positioning are arranged adaptively and will completely fill the display screen as necessary to accommodate changing circumstances. The effect of the additional area of active video provided by the text is to change the aspect ratio of the active video such that the ratio is less than the ratio of the display. As a result, the vertically-full signal is displayed with sidebars.

A 16×9 format display ratio letterbox picture, which is carried in a 4×3 format display ratio signal, can be progressively scanned by line doubling or line addition, so as to provide a larger display with sufficient vertical resolution. A wide screen television in accordance with this invention can display such a 16×9 format display ratio signal from a main source, one or more auxiliary sources, or an external RGB source.

It is possible to make various uses of inactive video areas in a display. For example, the inactive areas are sometimes used for text information such as weather or news reporting in letterbox format broadcasts. The inactive areas can have a superimposed picture added, for example for previewing another channel. This invention does not concern the use made of the inactive video areas so much as the amount of area which will be rendered inactive by the television receiver in adjusting a source having inactive areas to a display.

Data sampling limitations in the auxiliary video signal processing path complicate the generation of a high resolution picture which is as large in size as the display from the main video signal. Various methods can be developed for overcoming these complications.

Figure 2:
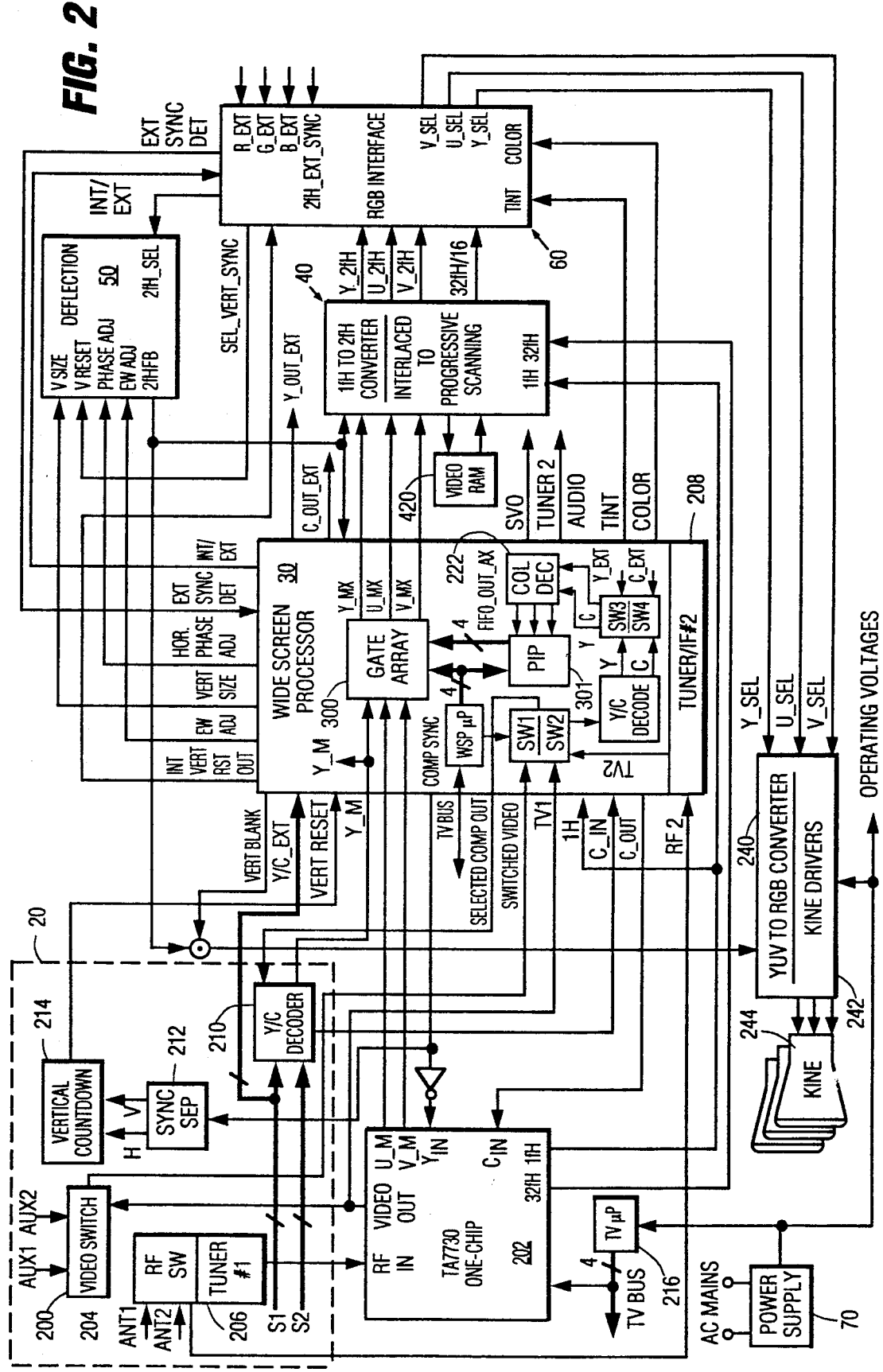
FIG. 2 is a block diagram of a wide screen television in accordance with aspects of this invention and adapted for operation at $2f_H$ horizontal scanning.

An overall block diagram for a wide screen television incorporating the inventive arrangements, and adapted to operate with $2f_H$ horizontal scanning, is shown in FIG. 2 and generally designated 10. The television 10 generally comprises a video signals input section 20, a chassis or TV microprocessor 216, a wide screen processor 30 having a wide screen processor 309, a $1f_H$ to $2f_H$ converter 40, a deflection circuit 50, an RGB interface 60, a YUV to RGB converter 240, kine drivers 242, direct view or projection tubes 244 and a power supply 70. The grouping of various circuits into different functional blocks is made for purposes of convenience in description, and is not intended as limiting the physical position, packaging or specific coupling of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT2. These represent inputs for both off-air antenna reception and cable reception. The RF switch 204 controls which antenna input is supplied to a first tuner 206 and to a second tuner 208. The output of first tuner 206 is an input to a one-chip controller 202, which performs a number of functions related to tuning, horizontal and vertical deflection and video controls. The particular one-chip shown is industry designated type TA7730. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

A switch SW1 of wide screen processor 30 selects between the TV1 and SWITCHED VIDEO signals to choose the source for the SELECTED COMP OUT video signal which is an input to a Y/C decoder 210. The Y/C decoder 210 may be implemented as an adaptive line comb filter. Two further video sources S1 and S2 are also inputs to the Y/C decoder 210. S1 and S2 designates different S-VHS sources, and each consists of separate luminance and chrominance signals. A switch, which may be incorporated as part of the Y/C decoder as in some adaptive line comb filters, or which may be implemented as a separate switch, is responsive to the TV microprocessor 216 for selecting one pair of luminance and chrominance signals as outputs designated Y_M and C_IN respectively. The selected pair of luminance and chrominance signals is thereafter considered the main signal and is processed along a main signal path. Signal designations including _M or _MN refer to the main signal path. The chrominance signal C_IN is redirected by the wide screen processor back to the one-chip 202, for developing color difference signals U_M and V_M. In this regard, U is an equivalent designation for (R-Y) and V is an equivalent designation for (B-Y). The Y_M, U_M, and V_M signals are converted to digital form in the wide screen processor for further signal processing.

The second tuner 208, functionally defined as part of the wide screen processor 30, develops a baseband video signal TV2. A switch SW2 selects between the TV2 and SWITCHED VIDEO signals for input to Y/C decoder 220. The Y/C decoder 220 may be implemented as an adaptive line comb filter. Switches SW3 and SW4 select between the luminance and chrominance outputs of Y/C decoder 220 and the luminance and chrominance signals of an external video source, designated Y_EXT and C_EXT respectively. The Y_EXT and C_EXT signals correspond to the S-VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated Y_A. Signal designations including _A, _AX and _AUX refer to the auxiliary signal path. The selected chrominance is converted to color difference signals U_A and V_A. The Y_A, U_A and V_A signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to Y_M, is provided by the wide screen processor to a sync separator 212. The horizontal and vertical synchronizing components H and V respectively are inputs to a vertical countdown circuit 214. The vertical countdown circuit develops a vertical reset signal which is directed into the wide screen processor 30. The wide screen processor generates an internal vertical reset output signal INT VERT RST OUT directed to the RGB interface 60. The RGB interface 60 includes switching means which selects between the internal vertical reset output signal and the vertical synchronizing component of the external RGB source to produce a selected vertical synchronizing component SEL_VERT_SYNC, which is directed to the deflection circuit 50. Horizontal and vertical synchronizing signals of the auxiliary video signal are developed by sync separator 250 in the wide screen processor.

The $1f_H$ to $2f_H$ converter 40 is responsible for converting interlaced video signals to progressively scanned noninterlaced signals, for example wherein each horizontal line is displayed twice, or an additional set of horizontal lines is generated by interpolating adjacent horizontal lines of the same field. In some instances, selective use of a previous line or an interpolated line will depend upon the level of movement which is detected between adjacent fields or frames.

The converter circuit 40 operates in conjunction with a video RAM 420. The video ram may be used to store one or more fields of a frame, to enable the progressive display. The converted video data, shown in FIG. 2 as signals $Y\_2f_H$, $U\_2f_H$ and $V\_2f_H$, is supplied to the RGB interface 60.

The RGB interface 60 enables selection of the converted video data or external RGB video data for display by the video signals input section. The external RGB signal is deemed to be a wide format display ratio signal adapted for $2f_H$ scanning. The vertical synchronizing component of the main signal is supplied to the RGB interface by the wide screen processor as INT VERT RST OUT, enabling a selected vertical sync corresponding to the main video or the external video to be available to the deflection circuit 50. Operation of the wide screen television enables user selection of an external RGB signal, by generating an internal/external control signal INT/EXT. However, the selection of an external RGB signal input, in the absence of such a signal, can result in vertical collapse of the raster, and potential damage to the cathode ray tube or projection tubes. Accordingly, the RGB interface circuit detects the presence of an external synchronizing signal, and overrides selection of a non-existent external RGB input to avoid such damage. The WSP microprocessor (WSP μP 309) also supplies color and tint controls for the external RGB signal.

The wide screen processor 30 can include a picture-in-picture processor 301 for special signal processing of the auxiliary video signal. The term picture-in-picture is sometimes abbreviated as PIP or pix-in-pix. For this function a gate array 300 combines the main and auxiliary video signal data in a wide variety of possible display formats, for example with the auxiliary signal displayed on an area of the main display or in the inactive video border regions. The picture-in-picture processor 301 and gate array 300 are under the control of the wide screen microprocessor (WSP μP). The WSP microprocessor is responsive to the TV microprocessor 216 over a serial bus. The serial bus includes signal paths for data, clock signals, enable signals and reset signals. The wide screen processor 30 also generates a composite vertical blanking/reset signal, as a three level sandcastle signal. Alternatively, the vertical blanking and reset signals can be generated as separate signals. A composite blanking signal is supplied by the video signal input section to the RGB interface.

Figure 4:
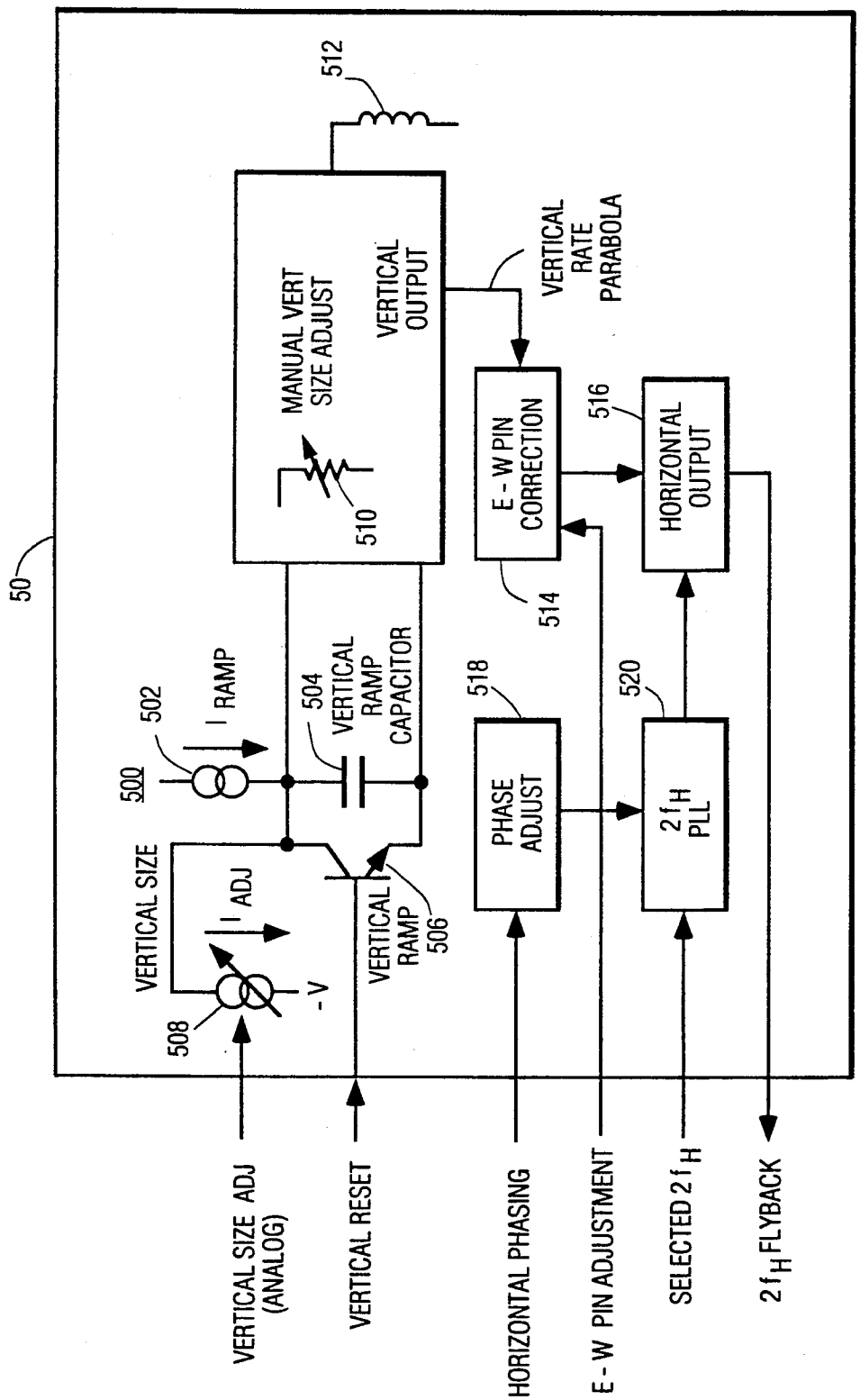
FIG. 4 is a combination block and circuit diagram for the deflection circuit shown in FIG. 2.

The deflection circuit 50, shown in more detail in FIG. 4, receives a vertical reset signal from the wide screen processor, a selected $2f_H$ horizontal synchronizing signal from the RGB interface 60 and additional control signals from the wide screen processor. These additional control signals relate to horizontal phasing, vertical size adjustment and east-west pincushion correction. The deflection circuit 50 supplies $2f_H$ flyback pulses to the wide screen processor 30, the $1f_H$ to $2f_H$ converter 40 and the YUV to RGB converter 240.

Operating voltages for the entire wide screen television are generated by a power supply 70 which can be energized by an AC mains supply.

With further reference to FIG. 2, the principal components of the wide screen processor are a gate array 300, a picture in picture circuit 301, analog to digital and digital to analog converters (not shown), the second tuner 208, a wide screen processor microprocessor and a wide screen output encoder. The gate array 300 and the included signal paths and functions are shown in more detail in FIG. 3. The gate array 300 is responsible for combining video information from the main and auxiliary signal paths to implement a composite wide screen display, for example one having a picture in picture or other formatting of plural sources for display on the screen. Clocking information for the gate array can be provided by a phase locked loop tracking the $1f_H$ signal of the selected source. The main video signal is supplied to the wide screen processor in analog form, and YUV format, as signals designated Y_M, U_M and V_M from the Y/C decoder 210 and the one-chip 202, shown in FIG. 2. These signals are converted from analog to digital form for digital manipulation as necessary, and later are converted from digital to analog for reading out the required video information, in known manner using A to D and D to A converters (not shown).

The color component signals are referred to by the generic designations U and V, which may be assigned to either R-Y or B-Y signals, or I and Q signals. The sampled luminance bandwidth is limited to 8 MHz because the system clock rate is $1024f_H$, or approximately 16 MHz. A single analog to digital converter and an analog switch can be multiplexed to sample the color component data because the U and V signals are limited to 500 KHz, or 1.5 MHz for wide I. A start of line pulse can be generated to synchronize the multiplexing arrangement at the beginning of each horizontal video line, thereafter toggling during the horizontal line, with the Y and UV data streams being shifted to correctly pair the samples. Each UV pair represents one vector and must be paired with the corresponding V element of the same vector to prevent a color shift.

The PIP circuit and/or the gate array may include means for enhancing the resolution of the auxiliary data to be superimposed on the picture notwithstanding the data compression. A number of data reduction and data restoration schemes have been developed, including for example paired pixel compression and dithering and dedithering. Moreover, different dithering sequences involving different numbers of bits and different paired pixel compressions involving different numbers of bits are contemplated. One of a number of particular data reduction and restoration schemes can be selected by the WSP μP 309 in order to maximize resolution of the displayed video for each particular kind of picture display format.

The gate array includes interpolators which operate in conjunction with line memories, which may be implemented as first in first out memories or FIFO's 356 and 358. The interpolator and FIFO's are utilized to resample the main signal as desired. An additional interpolator can resample the auxiliary signal. Clock and synchronizing circuits in the gate array control the data manipulation of both the main and auxiliary signals, including the combination thereof into a single output video signal having Y_MX, U_MX and V_MX components. These output components are converted to analog form by digital to analog converters (not shown) associated with $1f_H$ to $2f_H$ converter 40. The analog form signals, designated Y, U and V, are converted by $1f_H$ to $2f_H$ converter 40 to noninterlaced scanning.

For adjusting the aspect ratio of the displayed signal to take advantage of the available vertical or horizontal display span in accordance with user requirements, operation of the deflection circuit is adjusted as needed. The deflection circuit 50 is shown in more detail in FIG. 4. A circuit 500 is provided for adjusting the vertical size of the raster, in accordance with a desired amount of vertical overscan necessary for implementing different display formats. As illustrated diagrammatically, a constant current source 502 provides a constant current $I_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current $I_{RAMP}$ provides the maximum available vertical size for the raster. This might correspond to the extent of vertical overscan needed to fill the wide screen display by an expanded 4×3 format display ratio signal source. To the extent that less vertical raster size is required, an adjustable current source 508 diverts a variable amount of current $I_{ADJ}$ from $I_{RAMP}$, so that vertical ramp capacitor 504 charges more slowly and to a smaller peak value. Variable current source 508 is responsive to a vertical size adjust signal. This signal is presented in analog form, generated by vertical size control circuit 1030 shown in FIG. 9, whereby the vertical size is automatically adjusted over a continuous range rather than switched abruptly from one size to another. Vertical size adjustment 500 is independent of a manual vertical size adjustment 510, which may be implemented by a potentiometer or back panel adjustment knob. In either event, the vertical deflection coil(s) 512 receive(s) driving current of the proper magnitude. Horizontal deflection adjustment is likewise provided. The horizontal size is changed by phase adjusting circuit 518, East-West pin correction circuit 514, a $2f_H$ phase locked loop 520 and horizontal output circuit 516.

The RGB interface circuit 60 is shown generally in FIG. 2. The signal which is to be ultimately displayed will be selected between the output of the $1f_H$ to $2f_H$ converter 40 and an external RGB input. For purposes of the wide screen television described herein, the external RGB input is presumed to be a wide format display ratio, progressively scanned source. A composite blanking signal is also available from the video signals input section 20. The external $2f_H$ composite synchronizing signal for the external RGB signal is coupled through to generate an external sync detect signal coupled to wide screen processor 30. Selection of internal or external synchronization is generated by the WSP μP 309 and signalled to the RGB interface via the INT/EXT line. Selection of internal or external video sources is a user selection. However, if a user inadvertently selects an external RGB source, when no such source is in fact operational, an override control signal prevents selection of the external RGB source. The RGB interface 60 also receives tint and color control signals from the WSP μP 309.

The wide screen television can be arranged to expand or compress video as well as to adjust the format ratio by selecting an amount of overscan, as a user selectable option. Similarly, special effects such as picture-in-picture effects requiring an adjustment of the video resolution can be accomplished. The picture-in-picture processor includes analog-to-digital conversion means, timing and control circuits and a digital-to-analog converter section for adjustments to resolution, being accomplished together with corresponding deflection adjustments to achieve a desired effect.

A known picture-in-picture processor is the CPIP chip developed by Thomson Consumer Electronics, Inc., as described a publication entitled The CTC 140 Picture in Picture (CPIP) Technical Training Manual, available from Thomson Consumer Electronics, Inc., Indianapolis, Ind. In a single picture mode, or in a picture-in-picture mode, it is possible to enable a user to alter the relative sizes of a plurality of pictures being displayed, for example to zoom in on a selected portion of a single picture, for example, in steps. While in the zoom mode a user may search or plan through the picture, display the small, large or zoomed picture in freeze frame (still picture) format, etc.

The picture-in-picture processor can asymmetrically compress video data in one of a plurality of selectable display modes. In one mode of operation, for example, the pictures are compressed 4:1 in the horizontal direction and 3:1 in the vertical direction. Asymmetric compression of course produces aspect ratio distorted pictures as stored in the video RAM. However, if these pictures are read out normally, as for example in the channel scan mode, for display of a 16×9 format display ratio screen, the pictures appear correct. The picture fills the required area of the screen and there is no aspect ratio distortion. Asymmetric compression by the picture-in-picture processor makes it possible to generate the special display formats on a 16×9 screen without external speed up circuitry.

Figure 3:
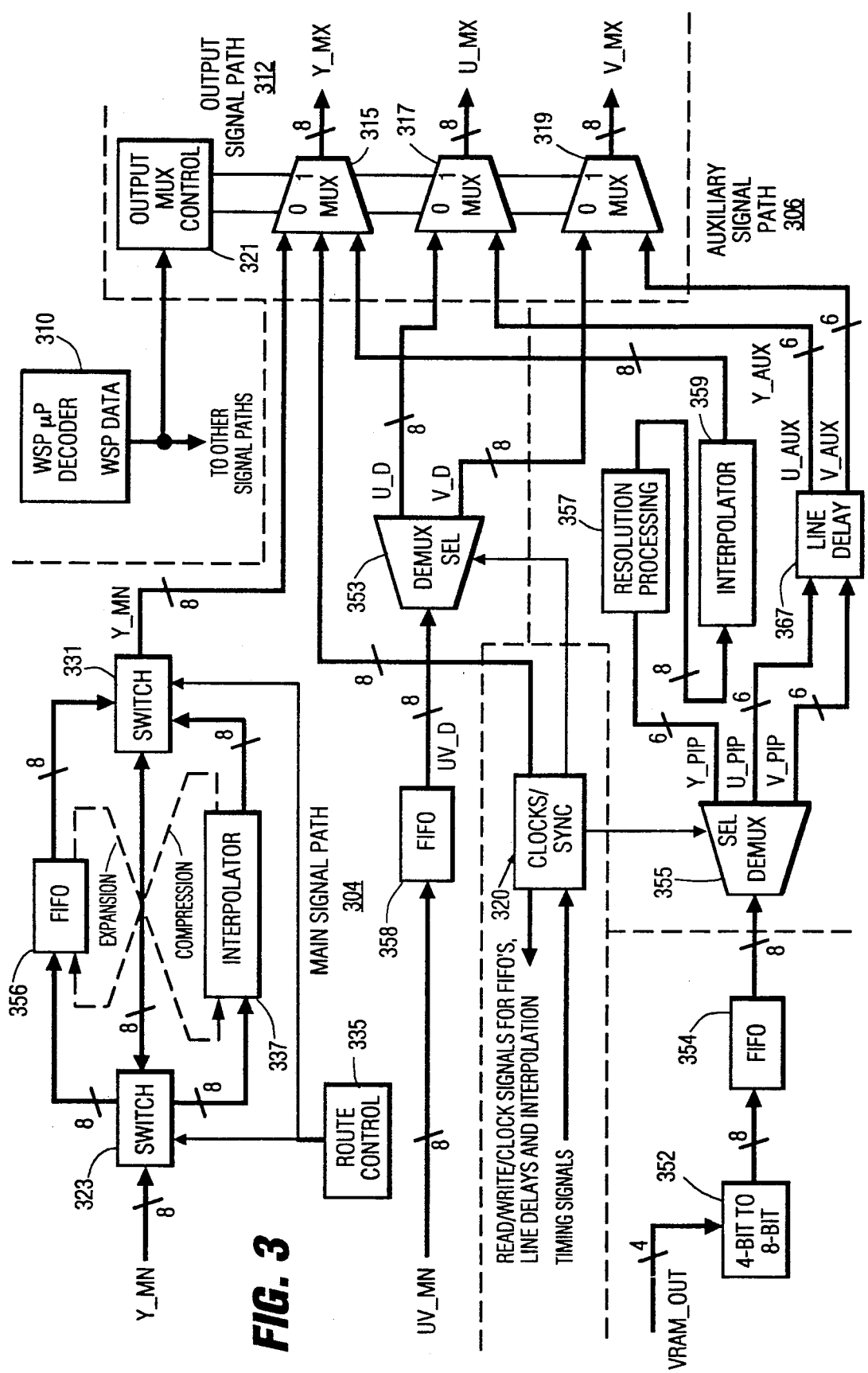
FIG. 3 is a block diagram of a gate array for embodying the television according to FIG. 2, illustrating main, auxiliary and output signal paths.

For expansion and compression, including the adjustment of the deflection circuit and the resolution in connection with a main and auxiliary (e.g., PIP) signal, the main signal path 304, auxiliary signal path 306 and output signal path 312 of the gate array 300 are shown in block diagram form in FIG. 3. The gate array also comprises a clocks/sync circuit 320 and a WSP μP decoder 310. Data and address output lines of the WSP μP decoder 310, identified as WSP DATA, are supplied to each of the main circuits and paths identified above, as well as to the picture-in-picture processor and resolution processing circuits. In the example as shown in FIG. 2 the PIP 301 and other elements are shown as separate from the gate array 300 in the wide screen processor 30. It will be appreciated that whether or not certain circuits are, or are not, defined as being part of the gate array is largely a matter of convenience for facilitating explanation of the inventive arrangements, because it is readily possible to either incorporate additional functions in a gate array or to remove certain functions to be accomplished by circuits apart from the gate array.

The gate array is responsible for expanding, compressing and cropping video data of the main video channel, as and if necessary, to implement different picture display formats. Referring to FIG. 3, the luminance component Y_MN is stored in a first in first out (FIFO) line memory 356 for a length of time depending on the nature of the interpolation of the luminance component. The combined chrominance components U/V_MN are stored in FIFO 358. Auxiliary signal luminance and chrominance components Y_PIP, U_PIP and V_PIP are developed by demultiplexer 355. The luminance component undergoes resolution processing, as desired and as discussed above, in circuit 357, and is expanded as necessary by interpolator 359, generating signal Y_AUX as an output.

In some instances, the auxiliary display will be as large as the main signal display. Memory limitations associated with the picture-in-picture processor and video RAM 350 can result in an insufficient number of data points or pixels for filling a large display area. In those circumstances, resolution processing circuit 357 can be used to restore pixels to the auxiliary video signal, i.e. to insert pixels for those lost during data compression, or reduction. Inserted pixels can be repeated or can be defined by the values for several neighboring pixels. Dithering/dedithering arrangements can also be effected.

The auxiliary channel is sampled at $640f_H$ rate while the main channel is sampled at a $1024f_H$ rate. The auxiliary channel FIFO 354 converts the data from the auxiliary channel sample rate to the main channel clock rate. In this process, the video signal undergoes an $$\frac{8}{5} \cdot \frac{1024}{640}$$

compression. This is more than the 4/3 compression necessary to correctly display the auxiliary channel signal. Therefore, the auxiliary channel must be expanded by the interpolator 359 to correctly display a 4×3 small picture. The interpolator 359 is controlled by interpolator control circuit 371, which is itself responsive to WSP μP 340. The amount of interpolator expansion required is 5/6. The expansion factor X is determined as follows:

$$X = \frac{640}{1024} \cdot \frac{4}{3} = \frac{5}{6}$$

The chrominance components U_PIP and V_PIP are delayed by circuit 367 for a length of time depending on the nature of the interpolation of the luminance component, generating signals U_AUX and V_AUX as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to a clock signal, a start of line signal, a horizontal line counter signal, the vertical blanking reset signal and the output of the fast switch from the picture-in-picture processor and WSP μP 340. The multiplexed luminance and chrominance components Y_MX, U_MX and V_MX are supplied to respective digital/analog converters 360, 362 and 364 respectively, followed by low pass filters. The various functions of the picture-in-picture processor, the gate array and the data reduction circuit are controlled by the WSP μP. The WSP μP is responsive to the TV μP 216, being connected thereto by a serial bus. The serial bus may be a four wire bus as shown, having lines for data, clock signals, enable signals and reset signals. The WSP μP communicates with the different circuits of the gate array through a WSP μP decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a $1024f_H$ clock.

As shown in FIG. 3, the luminance data Y_MN is routed through an interpolator 337 in the main signal path 304 which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for picture compression, or whether the FIFO 356 precedes the interpolator 337, as required for picture expansion. The switches 323 and 331 are responsive to a route control circuit 335, which is itself responsive to the WSP μP. The auxiliary video signal is compressed for storage in a video RAM, and only expansion is necessary for practical purposes. Accordingly, no comparable switching is required in the auxiliary signal path.

In order to implement video compressions through the use of a FIFO, for example, every fourth sample can be inhibited from being written into the FIFO 356. This constitutes a 4/3 compression. It is the function of the interpolator 337 to recalculate the luminance samples being written into the FIFO so that the data read out of the FIFO is smooth, rather than jagged. Expansions may be performed in exactly the opposite manner as compressions. In the case of compressions the write enable signal has clock gating information attached to it in the form of inhibit pulses. For expanding data, the clock gating information is applied to the read enable signal. This will pause the data as it is being read from the FIFO 356. In this case it is the function of the interpolator 337, which follows the FIFO 356 during this process, to recalculate the sampled data from jagged to smooth. In the expansion case the data must pause while being read from the FIFO 356 and while being clocked into the interpolator 337. This is different from the compression case where the data is continuously clocked through the interpolator 337. For both cases, compression and expansion, the clock gating operations can easily be performed in a synchronous manner, that is, events can occur based on the rising edges of the system clock $1024f_H$.

Interpolation of the auxiliary signal takes place in the auxiliary signal path 306. The PIP circuit 301 manipulates a 6 bit Y, U, V, 8:1:1 field memory in a video RAM to store incoming video data. The output of this video RAM is coupled to 4 to 8 bit converter 352 in FIG. 3. The video RAM holds two fields of video data in a plurality of memory locations. Each memory location holding eight bits of data. In each 8-bit location there is one 6-bit Y (luminance) sample (sampled at $640f_H$) and 2 other bits. These two other bits can be used to hold part of a U or V sample (sampled at the lower rate of $80f_H$). Alternatively or additionally, the bits can be used to indicate which type of field was written into the video RAM. Since there are two fields of data stored in the video RAM, and the entire video RAM is read during the display period, both fields are read during the display scan. The PIP circuit 301 thus can determine which field will be read out of the memory to be displayed. The PIP circuit always reads the opposite field type that is being written to overcome a motion tear problem. If the field type being read is the opposite type than that being displayed, then the even field stored in the video RAM is inverted by deleting the top line of the field when the field is read out of memory. The result is that the small picture maintains correct interlace without a motion tear.

The clocks/sync circuit 320 generates read, write and enable signals needed for operating FIFOs 354, 356 and 358. The FIFOs for the main and auxiliary channels are enabled for writing data into storage for those portions of each video line which is required for subsequent display. Data is written selectively from one of the main or auxiliary channels, but not both, as necessary to present data from each source on the same video line or lines of the display. The FIFO 354 of the auxiliary channel is written synchronously with the auxiliary video signal, but is read out of memory synchronously with the main video signal. The main video signal components are read into the FIFOs 356 and 358 synchronously with the main video signal, and are read out of memory synchronously with the main video. How often the read function is switched back and forth between the main and auxiliary channels is a function of the particular special effect chosen.

Generation of different special effects such as cropped side-by-side pictures are accomplished through manipulating the read and write enable control signals for the line memory FIFOs. For example in the case of cropped side-by-side displayed pictures, the write enable control signal FIFO 354 of the auxiliary channel is active for a portion of the display active line period to effect cropping.

In each of the FIFOs, the video data is buffered to be read out at a particular point in time. The active region of time where the data may be read out from each FIFO is determined by the display format chosen. In a side-by-side cropped mode, the main channel video can be displayed on the left hand half of the display and the auxiliary channel video on the right hand half. The arbitrary video portions of the waveforms are different for the main and auxiliary channels. The read enable control signal of the main channel FIFOs is thus active for 50% of the display active line period of the display beginning with the start of active video (immediately following the video back porch). The auxiliary channel read enable control signal is then active for the other 50% of the display active line period beginning with the falling edge of the main channel enable signal and ending with the beginning of the main channel video front porch. The write enable control signals are preferably synchronous with their respective FIFO input data (main or auxiliary) while the read enable control signals are synchronous with the main channel video.

A side by side display of two signals on a wide format display ratio display, for example 16×9 is another example. Most NTSC signals are represented in a 4×3 format, which corresponds to 12×9. Two 4×3 format display ratio NTSC pictures may be presented on the same 16×9 format display ratio display. It is necessary either to crop or squeeze the pictures by 33%. If cropping or squeezing to this extent is unacceptable to the user due to the picture loss or the aspect ratio distortion entailed, a combination of lesser proportions of cropping and distortion may be more acceptable. Depending on user preference as selected by switch inputs and/or programming, the ratios of picture cropping and aspect ratio distortion may be set any where in a range between the limits of 0% and 33% so as to reach the desired results in a combination of both. As an example, two side by side pictures may be presented as 16.7% squeezed and 16.7% cropped, thereby minimizing the adverse effects of each.

The horizontal display time for a 16×9 format display ratio display is the same as a 4×3 format display ratio display, because both have 62.5 microsecond nominal line length. An NTSC video signal must be sped up by a factor of 4/3 to preserve a correct aspect ratio, without distortion. The 4/3 factor is calculated as ratio of the two display formats:

$$\frac{4}{3} = \frac{16}{9} \div \frac{4}{3}$$

Variable interpolators are utilized in accordance with aspects of this invention to speed up the video signals. In the past, FIFOs having different clock rates at the inputs and outputs have been used to perform a similar function. By way of comparison, if two NTSC 4×3 format display ratio signals are displayed on a single 4×3 format display ratio display, each picture must be distorted or cropped, or some combination thereof, by 50%. A speed up comparable to that needed for a wide screen application is unnecessary.

Generally, the video display and deflection system is synchronized with the main video signal. The main video signal must be speeded up, as explained above, to fill the wide screen display. The auxiliary video signal must be vertically synchronized with the first video signal and the video display. The auxiliary video signal can be delayed by a fraction of a field period in a field memory, and then expanded in a line memory. Synchronization of the auxiliary video data with main video data is accomplished by utilizing the video RAM 350 as a field memory and a first in first out (FIFO) line memory device 354 for expanding the signal.

The asynchronous nature of the read and write clocks, however, does require that steps be undertaken to avoid read/write pointer collisions. Read/write pointer collisions occur when old data is read out of the FIFO before new data has an opportunity to be written into the FIFO. Read/write pointer collisions also occur when new data overwrites the memory before the old data has an opportunity to be read out of the FIFO. The size of the FIFO is related to the minimum line storage capacity thought to be reasonably necessary to avoid read/write pointer collisions.

The picture-in-picture processor operates in such a manner that the auxiliary video data is sampled with a 640$f_H$ clock locked to the horizontal synchronizing component of the incoming auxiliary video signal. This operation enables orthogonally sampled data to be stored in the video RAM. Data must be read out of the video RAM at the same 640$f_H$ rate. The data cannot be orthogonally displayed from the video RAM without modification due to the generally asynchronous nature of the main and auxiliary video sources. In order to facilitate synchronization of the auxiliary signal to the main signal, a line memory with independent write and read port clocks is disposed in the auxiliary signal path after the output of the video RAM.

Since the reading and writing of data from the auxiliary channel FIFO is asynchronous, and the read clock rate is considerably faster than the write clock rate, there is the possibility of read/write pointer collisions. A read/write pointer collision occurs when a read enable signal is received before old data, that has already been read previously, has been replaced by newly written data. Interlace integrity must also be preserved. A sufficiently large memory must be chosen in the first instance in order to avoid read/write pointer collision in the auxiliary channel FIFO.

It is a particular advantage of wide format display ratio televisions that different aspect ratio signals, including the relatively standard 16×9 letterbox signals, can expanded to fill the wide format display ratio display screen, although it may be necessary to interpolate the signal to provide additional vertical resolution. In accordance with an aspect of the invention, an automatic and continuously variable circuit is provided to automatically detect inactive video areas characteristic of a display of one aspect ratio carried in a signal processed according to a different aspect ratio. For example, the invention is operable to sense the occurrence of inactive video areas at the top and bottom of a letterbox having a wide (e.g., 16×9) ratio in a signal transmitted or read out for display in a narrower (e.g., 4×3) ratio, and automatically to implement expansion of the narrower display ratio signal (e.g. 4×3) which includes the wider format display ratio letterbox display (e.g., 16×9) so as to use all of the available display area according to user preferences as discussed hereinabove. Similarly, horizontal expansion can be effected in the same manner when a wide display is available and a narrower signal is to be shown there. The expansion can be implemented using any or all of the expansion, compression or cropping alternatives discussed, using the circuit according to the invention described. The automatic letterbox detector is explained in detail in connection with FIGS. 5-9, using the relatively standard 4×3 and 16×9 aspect ratios as non-limiting examples.

In order to increase the vertical height of a letterbox signal (for example a 4×3 signal having a 16×9 active area and unused top and bottom bands), the vertical scan rate of display video is increased so that the black or matte regions at the top and bottom of the picture are eliminated, or at least substantially reduced. The automatic letterbox detector is based on the assumption that the video signal will correspond generally to that shown in diagram form in FIG. 5. Regions A and C have no active video, or least video luma levels which are less than a predetermined luma threshold and may be, for example, a black or gray signal or an unvarying colored matte. Region B has active video, or at least video luma levels which are more than the predetermined luma threshold and generally vary substantially in luminance, saturation and/or hue. The respective time intervals of regions A, B and C are a function of the letterbox format, which might range, for example, from 16×9 to 21×9. The time duration of regions A and C is approximately 20 lines each for 16×9 letterbox format. The letterbox detector examines the luma levels for regions A and/or C. If active video, or at least a minimum video luma level, is found in regions A and/or C, the letterbox detector provides an output signal, for example a logical 0, indicating a normal 4×3 format display ratio NTSC signal source. However, if video is detected in region B, but not in regions A and C, then the video is presumed to be a letterbox signal source. In this case, the output signal would be a logical 1.

Operation of the detector can be improved by hysteresis, as shown diagrammatically in FIG. 6. Once a letterbox signal at a particular active aspect ratio has been detected, a minimum number of successive fields of nonletterbox signal, or letterbox of a different aspect ratio may be required before the display is changed to that necessary for the new aspect ratio signals. A minimum number of fields can be required before switching the display to a wider or narrower screen mode.

A circuit 1000 for implementing this technique is shown in FIG. 7. The circuit 1000 comprises a line counter 1004, a field counter 1006 and a detector circuit 1002, in which the algorithm described above is performed to analyze the video signal. Briefly, the circuit is operable to determine the scene height by sensing for the first and last lines of active video, and to effect the user's selected options for cropping, compression, expansion, etc. in view of detected variations. Assuming that the object is to expand to the full available vertical height, the first and last line numbers are determined, and the average of the two defines a center line number. The letterbox detector then triggers positioning of the center line at the vertical center of the full screen available area, and linearly expands the picture vertically to place the first and last lines at the extreme top and bottom (or other user selection). Whereas the extent of expansion is determined by the active video area and is not simply switched, for example between 4×3 and 16×9, the apparatus accommodates any display ratio.

The letterbox detector can be arranged to update the first and last line count only once per frame for multiple field frames. The extent of the updating can be limited by filtering in order to expand or contract the display to a new aspect ratio slowly, i.e., over several frames, and to prevent jitter due to repetitive small changes or those induced by noise. In order to accomplish this filtering, the apparatus can require a change to exceed a change threshold before any response will be undertaken. The system is not affected by scenes with flat (relatively blank) fields at the lateral edges since it only looks for active video in the A and C letterbox regions.

Figure 10:
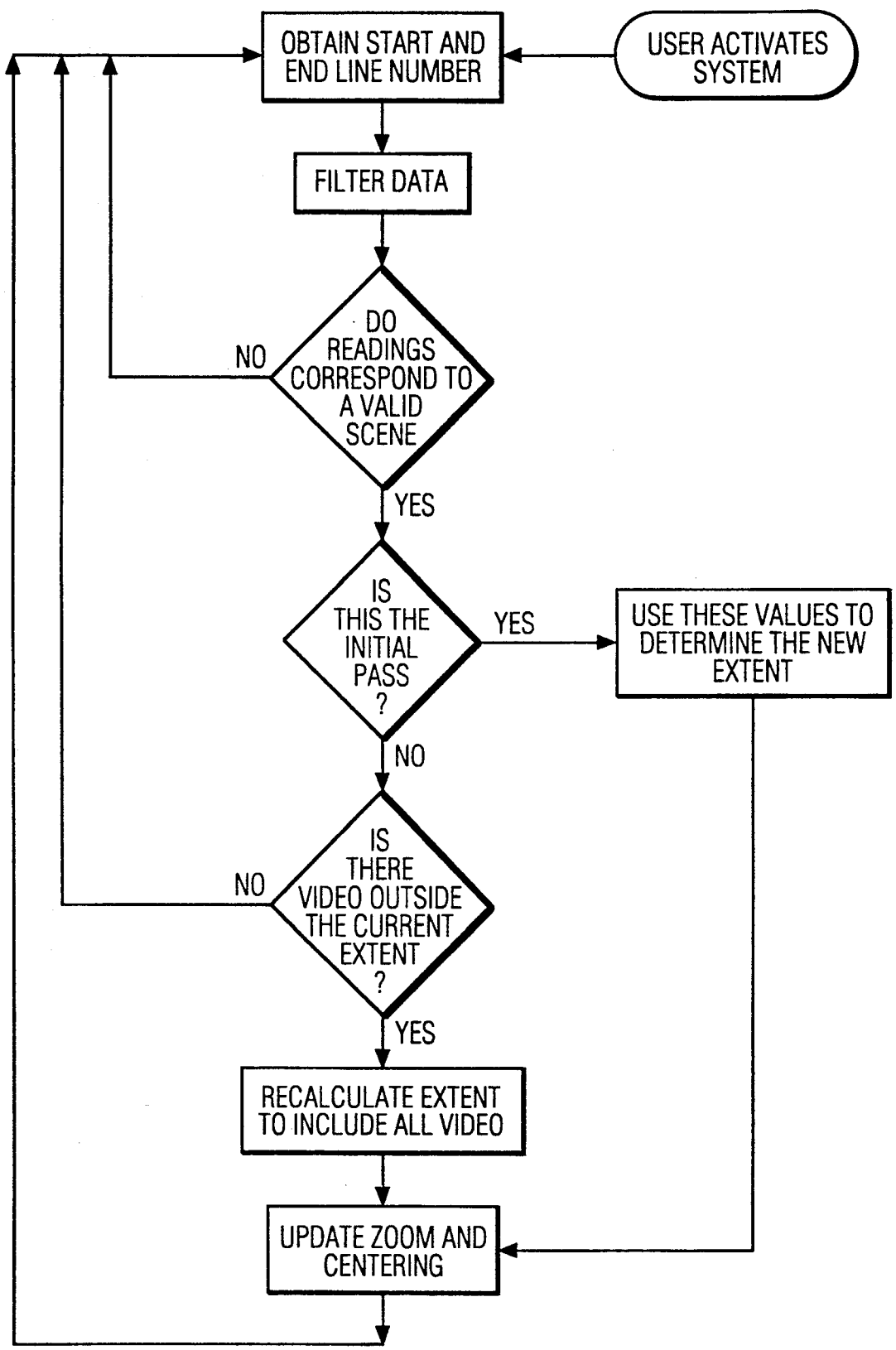
FIG. 10 is a flowchart useful for explaining the manner in which adaptive letterbox display is implemented according to an inventive arrangement.
Figure 11A:
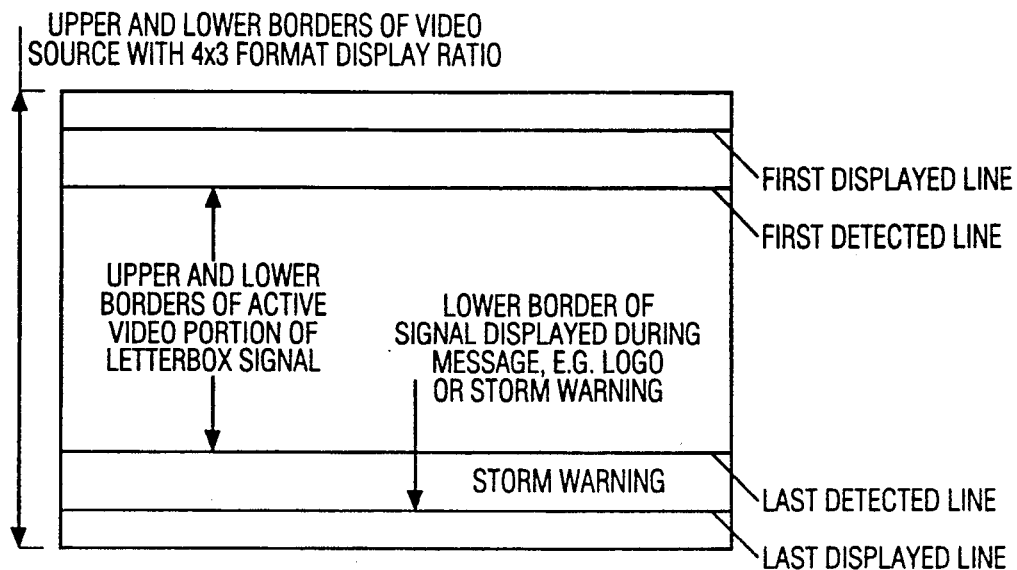
FIG. 11(a) is a diagram and FIG. 11(b) is a flowchart, together useful for explaining the manner in which adaptive letterbox display is reimplemented after interruption.
Figure 11B:
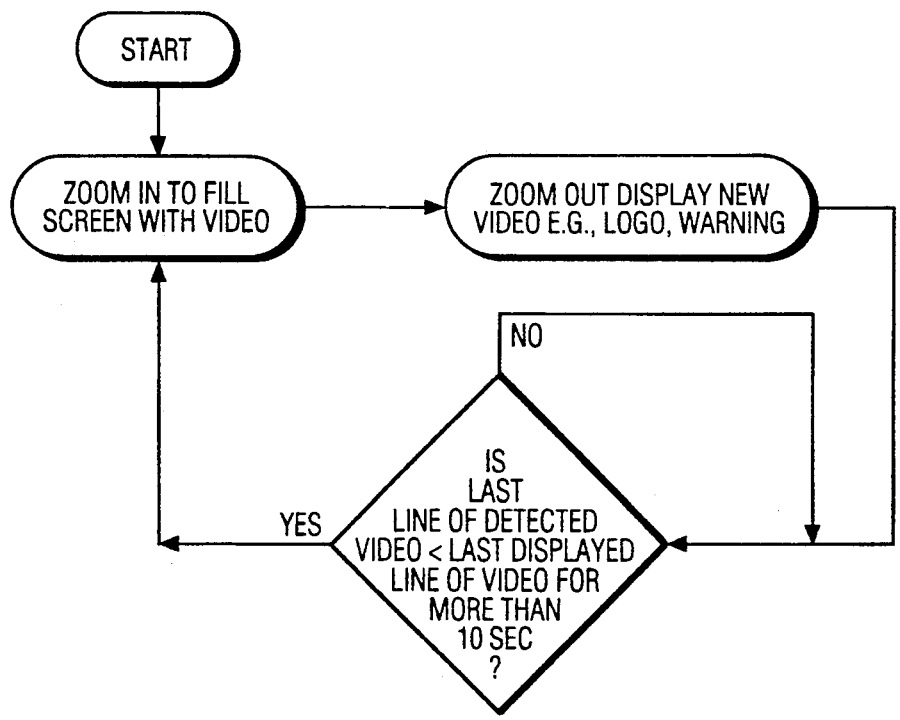

A flowchart illustrating an inventive arrangement for implementing a first mode of operation, with maximum zoom according to one of the criteria of maximal filling or maximal vertical filling, is shown in FIG. 10. While it is also possible to sense for active video in lateral sidebars, sensing is limited in the illustrated embodiment to upper and lower areas of potentially inactive video. By selecting the expansion, compression and cropping parameters using the first and last line numbers the apparatus has several advantages. If upon initially zooming into a picture the zoom passes the optimum level, the system promptly corrects itself as successive fields are evaluated. If subtitles, storm warnings or similar supplemental information appears in the border regions, these are detected as active video lines and the picture is adjusted to display them in a second mode of operation, in which the extent of the zoom is decreased. If the supplemental information disappears, the first mode of operation can be reimplemented, automatically or manually. The upper and lower borders of active video, with and without supplemental information, are shown in FIG. 11(a). The first and last video lines detected and displayed are also shown. As shown in FIG. 11(b), the system initially zooms in to fill the screen with video, according to either criteria for filling. The picture is then zoomed out, as much as necessary, to display supplemental information, if detected. If the supplemental information is no longer detected, for a predetermined period of time, for example 10 seconds, the zoom in mode of operation can be reimplemented. Reimplementation can occur if the last line of detected video is less than the last line of displayed video (as shown in FIG. 11(b)), or if the first line of detected video is greater than the first line of displayed video, or both.

The sensed first and last lines are compared to minimum/maximum allowed values, and the original aspect ratio is preserved in the event that the sensed values for the first and last line fall out of the allowed range. This avoids any response to occurrences such as blank scenes. For the first frame following activation of the apparatus the initially detected first and last line numbers are simply loaded, without filtering, and thereafter adjusted as necessary with filtering applied.

Two gradients are calculated for each line in the video field to determine lines of active video. Four values are required to calculate the two gradients: maximum and minimum values of the current line, and maximum and minimum values of the previous line. The first gradient, designated the positive gradient, is formed by subtracting the minimum value of the previous line from the maximum value of the current line. The second gradient, designated the negative gradient, is formed by subtracting the minimum value of the current line from the maximum value of the previous line. Either of the gradients may have positive or negative values depending on scene content, but the negative values of both gradients may be ignored. This is because only one gradient may be negative at a time, and the magnitude of the gradient with the positive value will always be greater than or equal to the magnitude of the gradient with the negative value. This simplifies the circuitry by eliminating the need to calculate an absolute value of the gradients. If either gradient has a positive value which exceeds a programmable threshold, video is considered to be present on either the current line or on the previous line. These values can be used by a microprocessor to determine the first and last lines of active video and thereby to determine the particular aspect ratio of the active area of the signal. This determination defines whether or not the video source is in the letterbox format, and enables the further calculation of the extent of change to the deflection circuit and the resolution circuits needed to convert the displayed signal as required. As mentioned herein, the conversion can be defined in part by user selections regarding the extent of cropping or distortion, or both, to which the signal will be subjected.

Figure 8:
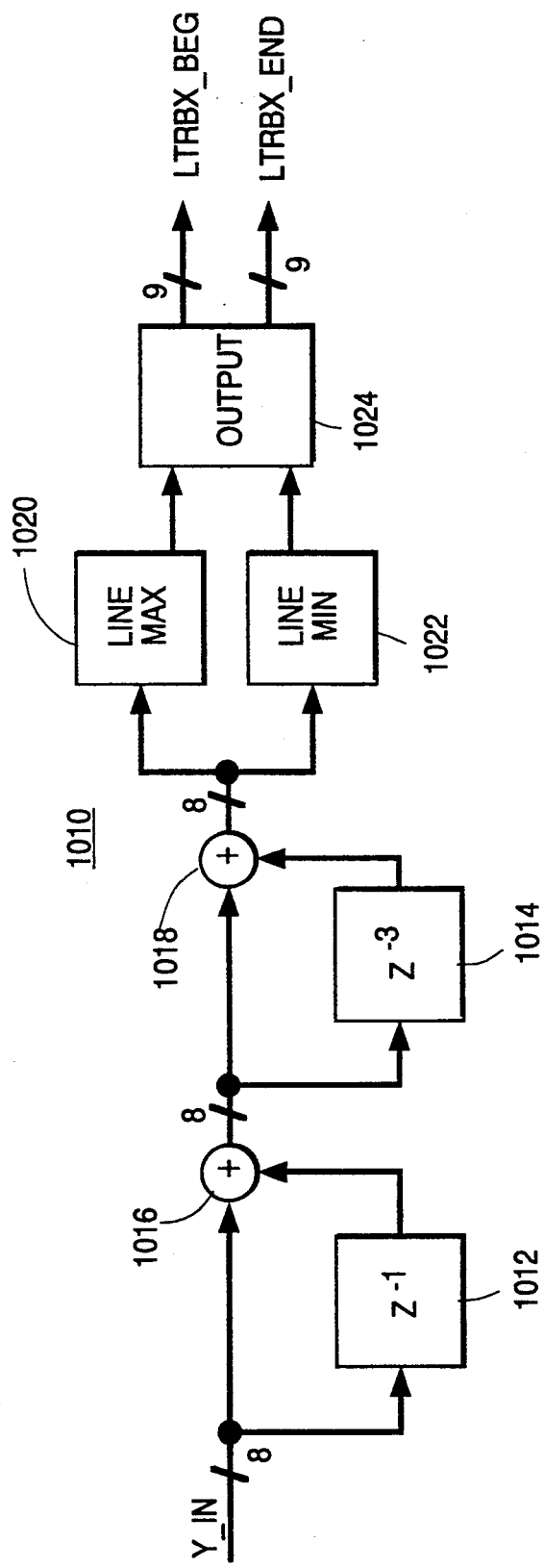
FIG. 8 is a block diagram of an alternative circuit for implementing an automatic letterbox detector.

A circuit 1010 for implementing this method of letterbox assessment or detection is shown in block diagram form in FIG. 8. The circuit 1010 comprises a luma input filter, a line maximum (max) detector 1020, a line minimum (min) detector 1022, and an output section 1024. The luma input filter comprises finite impulse response (FIR) stages 1012 and 1014 as well as adders 1016 and 1018. The letterbox detection circuit 1010 operates on the digital luma data Y_IN from the wide screen processor. An input filter is utilized in order to improve noise performance and make detection more reliable. The filter is essentially two cascaded FIR stages, having a transfer function as follows:

$$H(z) = \tfrac{1}{4} * (1 + Z^{-1}) * (1 + Z^{-3}).$$

The output of each stage is truncated to eight bits (divided by two) to maintain a DC gain of one.

The line max detector 1020 includes two registers. The first register contains the maximum pixel value (max pix) at the current point in the line period. It is initialized at the beginning of every line period by a one clock wide pulse designated SOL (Start of Line) to a value of 80 h. The value of 80 h represents the minimum possible value for an eight bit number in two's complement format (the most significant bit being the sign). The circuit is enabled by a signal, designated LTRBX EN, which goes high for approximately 70% of the active video line. The second register contains the maximum pixel value (max line) for the entire previous line, and is updated once per line period. Incoming luma data Y_IN is compared to the current maximum pixel value stored in the max pix register. If it exceeds the register value, the max pix register is updated on the next clock cycle. At the end of the video line, max pix will contain the maximum value over the entire portion of the line for which it was enabled. At the beginning of the next video line, the value of the max pix register is loaded into the max line register and the register is reloaded with 80 h.

The line minimum detector 1022 works in an identical manner except that the min line register will contain the minimum pixel value for the previous line. The min pix value is initialized to a value of 7 Fh, which is the maximum possible pixel value for an eight bit number in the two's complement format.

The output section 1024 will take the max line register value and the min line register value, and store them in eight bit latches that are updated once per line. Two gradients are then calculated, namely the positive gradient and the negative gradient. On the first line in a field where either of these gradients is positive and greater than the programmable threshold, an enable signal is generated which allows a first line register to be loaded with the current line count value. On every line where either of the gradients is positive and exceeds the programmable threshold, another enable signal is generated which allows a last line register to be loaded with the current line count value. In this manner the last line register will contain the last line in the field where the threshold was exceeded. Both of these enable signals are only allowed to occur between lines 24 and 250 in each field. This avoids false detections based on closed captioning information and on VCR head switching transients. At the beginning of every field, the circuit is reinitialized, and the values in the first line and last line registers are loaded into respective letterbox end registers. The LTTRBX_BEG and LTRBX_END signals mark the beginning and end respectively of a letterbox signal.

Figure 9:
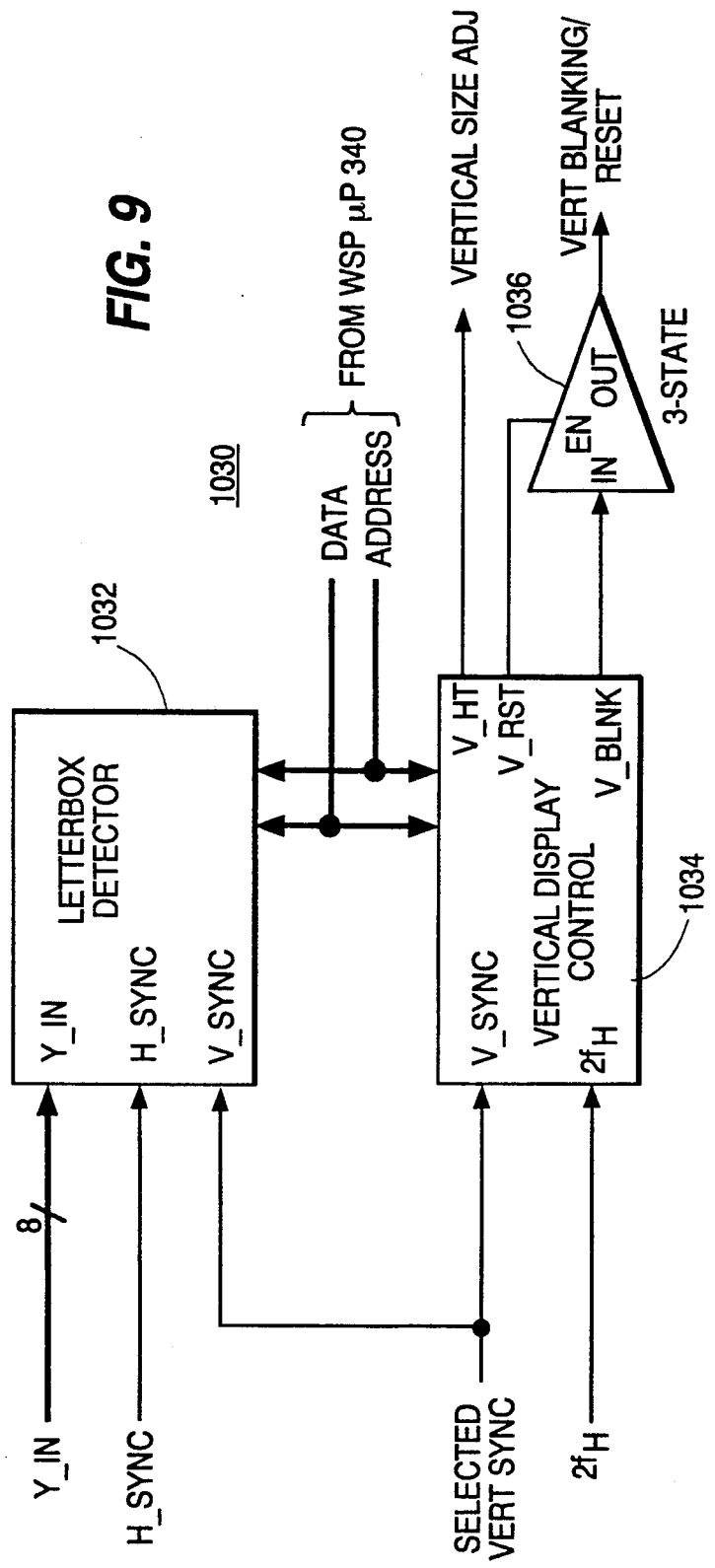
FIG. 9 is a block diagram of a vertical size control circuit including an automatic letterbox detector.

FIG. 9 illustrates an automatic letterbox detector as part of a vertical size control circuit 1030. The vertical size control circuit comprises a letterbox detector 1032, a vertical display control circuit 1032 and a 3-state output device 1034. In accordance with an inventive arrangement, the automatic letterbox detection circuit can automatically implement vertical zoom or expansion as required, for example to expand a 4×3 format display ratio signal which includes the 16×9 format display ratio letterbox display, or to expand other format display ratio signals as detected. When the output signal VERTICAL SIZE ADJ becomes active, the vertical deflection height is increased by the ratio required to employ the desired vertical height, typically the full vertical height. This enables the 16×9 active video portion of the letterbox portion of a 4×3 signal, for example, to fill a 16×9 wide screen without image aspect ratio distortion. Insofar as the display screen or the respective format ratios may have other specific values, the user's selections can define cropping or distortion particulars to display the scene as desired.

The automatic letterbox detector may rely wholly on the detection of active video lines, or additionally may comprise a circuit for decoding a code word or signal carried by a letterbox signal source which identifies the signal as letterbox format. This enables the system to respond precisely to standardized letterbox formats while preserving the ability to correct non-standard sizes as well.

The system as described can display quite a number of variations of multiple source or altered (cropped, expanded, etc.) signal display. The programming of WSP µP 309 can include a number of preset default arrangements wherein the system displays combinations of signals or signals altered in the manners described. Alternatively, or in addition, the user can selectively format the display using on-screen programming techniques or the like, as discussed for example with reference to the selection of individual sources for display. Any or all of the multiple sources can be provided in a particular aspect ratio (including a letterbox format) that does not involve active video in the same aspect ratio as the area devoted to that source in the display or the composite multiple source display. The WSP µP 309 can be arranged to make the same sort of expansion, compression or other alterations necessary to provide the desired display for the respective source. This requires simply that the lines of active video be sensed for each source and placed at the display positions required to adaptively position the active video in the display area.

What is claimed is:

1. A video display control system, comprising:
a video display means;
means for continuously detecting first and last lines of active video in a video signal;
means for storing scan line numbers corresponding to said first and last lines of active video;
means for determining picture height from said scan line numbers of said first and last lines of active video;
means for comparing said picture height to a threshold;
means operable in a first mode of operation for enabling said storing means to continuously update said stored scan line numbers unless said picture height exceeds said threshold, and operable in a second mode of operation for enabling said storing means to update said stored scan line numbers when active video is detected in a video line corresponding to a scan line number less than said stored first line or greater than said stored last line; and
means for controlling at least one of picture size and picture cropping on said display means responsive to said picture height.

2. The system of claim 1, comprising means for initiating said first mode of operation after said second mode of operation.

3. The system of claim 2, wherein said initiating means is responsive to a manual control.

4. The system of claim 2, wherein said initiating means is responsive to expiration of a timed interval.

5. The system of claim 2, wherein said initiating means is responsive to detecting an absence of said active video responsible for initiating said second mode of operation.

6. The system of claim 2, wherein said initiating means is responsive to detecting an absence, for a timed interval, of said active video responsible for initiating said second mode of operation.

7. The system of claim 1, wherein said detecting means comprises:

means for comparing respective minimum and maximum luminance values for a plurality of successive video lines;

means for storing minimum and maximum luminance values for said plurality of video lines;

means for generating gradients indicative of said stored values; and, means for comparing said gradients to threshold values.

8. The system of claim 1, wherein said display means comprises a dimensionally adjustable raster.

9. The system of claim 8, comprising zoom control means for dimensionally adjusting said raster incrementally over successive video frames.

10. The system of claim 1, comprising means for automatically vertically centering said picture on said display during both said modes of operation.

11. A video display control system, comprising:

a video display means having a wide format display ratio;

a letterbox format signal source detector, comprising:
means for continuously detecting first and last lines of active video in a video signal;

means for storing scan line numbers corresponding to said first and last lines of active video;

means for determining picture height from said scan line numbers of said first and last lines of active video;

means for comparing said picture height to a threshold indicative of a specific format display ratio letterbox signal; and, means operable in a first mode of operation for enabling said storing means to continuously update said stored scan line numbers unless said picture height exceeds said threshold, indicative of valid detection of a letterbox signal, and operable in a second mode of operation for enabling said storing means to update said stored scan line numbers when active video is detected in a video line corresponding to a scan line number less than said stored first line or greater than said stored last line;

means responsive to said letterbox detector for enlarging the picture on said display means responsive to said first mode of operation and reducing the picture on said display means responsive to said second mode of operation; and, means for initiating said first mode of operation after said second mode of operation.

12. The system of claim 11, wherein said initiating means is responsive to a manual control.

13. The system of claim 11, wherein said initiating means is responsive to expiration of a timed interval.

14. The system of claim 11, wherein said initiating means is responsive to detecting an absence, for a timed interval, of said active video responsible for initiating said second mode of operation.

15. The system of claim 11, wherein said detecting means comprises:

means for comparing respective minimum and maximum luminance values for a plurality of successive video lines;

means for storing minimum and maximum luminance values for said plurality of video lines;

means for generating gradients indicative of said stored values; and, means for comparing said gradients to threshold values.

16. The system of claim 11, comprising means for automatically vertically centering said picture on said display during both said modes of operation.

17. A video display control system, comprising:

video display means;

means for determining line numbers of first and last lines of active video in a video signal for identifying when said video signal has a letterbox format in which a picture is represented by an active video portion and upper and lower regions bordering said picture are represented by substantially inactive video portions;

means for enlarging said picture in size by a factor corresponding to the height of said picture;

means for enabling operation of said picture enlarging means when said video signal has been identified as having said letterbox format; and, means for changing said picture enlarging factor when active video is detected in at least one of said regions bordering said picture.

18. The system of claim 17, comprising means for disabling said means for changing said picture enlarging factor when said active video is no longer detected in at least one of said regions bordering said picture.

19. The system of claim 18, wherein said enlarging factor is rechosen after said means for changing said picture enlarging factor is disabled.

20. The system of claim 17, further comprising means for determining said picture height.

21. The system of claim 20, wherein said picture height is determined each time said letterbox format is detected and each time said means for changing said picture enlarging factor is disabled, and said enlarging factor is selected each time said picture height is determined.

22. The system of claim 20, wherein said picture height determining means comprises means for detecting the first and last lines of active video in said picture portion.

23. The system of claim 17, wherein said picture enlarging factor comprises a series of enlarging factors which are applied sequentially to incrementally change said picture in size over a succession of video frames.

24. A video display control system, comprising:

video display means;

means responsive to a video signal for identifying when said video signal has a letterbox format in which a picture is represented by an active video portion and upper and lower regions bordering said picture are represented by substantially inactive video portions;

means for enlarging said picture in size by a series of enlarging factors corresponding to the height of said picture which are applied sequentially to incrementally change said picture in size over a succession of video frames;

means for enabling operation of said picture enlarging means when said video signal has been identified as having said letterbox format; and, means for changing said picture enlarging factor when active video is detected in at least one of said regions bordering said picture.

* * * * *